US011957132B2

United States Patent
Chope et al.

(10) Patent No.: US 11,957,132 B2
(45) Date of Patent: Apr. 16, 2024

(54) POTATO STORAGE (71) Applicant: Frito-Lay Trading Company GmbH, Bern (CH)

(72) Inventors: Gemma A. Chope, Leicester (GB); Simon C. McWilliam, Leicester (GB); Leon A. Terry, Bedfordshire (GB); Katherine Cools, Binfeld (GB); Roberta Tosetti, Norwich Norfolk (GB)

(73) Assignee: Frito-Lay Trading Company GmbH, Bern (CH)

( * ) Notice: Subject to any disclaimer, the term of this patent is extended or adjusted under 35 U.S.C. 154(b) by 0 days.

(21) Appl. No.: 17/924,841

(22) PCT Filed: Nov. 10, 2020

(86) PCT No.: PCT/EP2020/081598
§ 371 (c)(1),
(2) Date: Nov. 11, 2022

(87) PCT Pub. No.: WO2021/228420
PCT Pub. Date: Nov. 18, 2021

(65) Prior Publication Data
US 2023/0284640 A1    Sep. 14, 2023

(30) Foreign Application Priority Data
May 15, 2020  (GB) .................... 2007265

(51) Int. Cl.
*A23B 7/04* (2006.01)
*A23B 7/144* (2006.01)

(52) U.S. Cl.
CPC ............ *A23B 7/0425* (2013.01); *A23B 7/144* (2013.01)

(58) Field of Classification Search
CPC ......... A23L 3/3526; A23B 7/14; A23B 7/152; A23B 7/154; A23B 7/0465; A23B 7/144; A23V 2002/00; A23V 2250/116
(Continued)

(56) References Cited

U.S. PATENT DOCUMENTS

| | | |
|---|---|---|
| 2007/0078058 A1 | 4/2007 | Olson et al. |
| 2007/0199242 A1 | 8/2007 | Hansen et al. |

FOREIGN PATENT DOCUMENTS

| | | |
|---|---|---|
| CN | 105767851 | 7/2016 |
| WO | 02/058464 | 8/2002 |

OTHER PUBLICATIONS

International Preliminary Report on Patentability issued in PCT/EP2020/081598 dated Nov. 15, 2022.
(Continued)

*Primary Examiner* — Subbalakshmi Prakash
(74) *Attorney, Agent, or Firm* — Barnes & Thornburg LLP; G. Peter Nichols (57) ABSTRACT

A method of storing potatoes, the method comprising the steps of: i. providing a plurality of dormant potatoes, wherein the potatoes have been cured after harvesting; ii. treating the potatoes with 1-methylcyclopropene, the treatment comprising exposing the potatoes, which are at a first treatment temperature within the range of from 10 to 30° C., to 1-methylcyclopropene; storing the potatoes at a second storage temperature within the range of from greater than 1 to up to 6° C. for a storage period within a potato store, wherein the storage period extends continuously until at least 1 week after initiation of eye movement in at least one of the potatoes, and wherein during the storage period the potatoes are stored in atmospheric air free of an external supply of ethylene sprout suppressant.

23 Claims, 3 Drawing Sheets (58) Field of Classification Search
USPC .......................................................... 426/665
See application file for complete search history.

(56) References Cited

OTHER PUBLICATIONS

International Search Report issued in PCT/EP2020/081598 dated Feb. 10, 2021.
Written Opinion issued in PCT/EP2020/081598 dated Feb. 10, 2021.
Secretaria et al., "Evaluation of Various Methods to Break Dormancy of Potato (*Solanum tuberosum* L. 'Granola') Minitubers," Biosciences Information Service (2018).
Lurie, "1-MCP in Post-Harvest: Physiological Mechanisms of Action and Applications," Fresh Produce, pp. 4-15, Jan. 1, 2007.
Search Report issued in GB2007265.8 dated Oct. 30, 2020.
Ethylene for Processing', presentation by Richard Colgan, Natural Resources Institute, University of Greenwich, London, UK, available since at least Apr. 2014 at https://www.youtube.com/watch?v=ZGimpmcIHNQ. (note especially the section from around 9:00 onwards).
Colgan et al., "Reducing Energy Usage and Wastage by Improving Ethylene Control of Potato Sprouting," Final Report Ref: R426, for Potato Council, AHDB, published 2013-2014, https://ahdb.org.uk/ethylene-and-sprout-control-for-processing-varieties.
Prange et al., "Effects of Ethylene and 1-Methylcyclopropene on Potato Tuber Sprout Control and Fry Color," Amer J of Potato Res (2005) 82:12-128.
Extended Search Report issued in EP 22204191.5 dated Jan. 26, 2023.
Foukaraki et al., "Differential Effect of Ethylene Supplementation and Inhibition on Abscisic Acid Metabolism of Potato (*Solanum tuberosum* L.) Tubers During Storage," Postharvest Biology and Technology, Elsevier, NL, vol. 112, pp. 37-94, Oct. 28, 2015.
Foukaraki et al., "Effect of the Transition Between Ethylene and Air Storage on Post-Harvest Quality in Six UK-grown Potato Cultivars," Journal of Horticultural Science and Biotechnology, vol. 89, No. 6, pp. 599-606, Jan. 7, 2014.
Foukaraki et al., "Impact of Ethylene and 1-MCP on Sprouting and Sugar Accumulation in Stored Potatoes," Postharvest Biology and Technology, Elsevier, NL, vol. 114, pp. 95-103, Dec. 21, 2015.
Foukaraki et al., Chapter V: "Effect of 1-MCP and Ethylene Treatments on the Postharvest Quality of Four UK-Grown Potato Cultivars," in "Storage of Potatoes: Effect of Ethylene and 1-MCP on Potato Tuber Quality and Biochemistry (Ph D Thesis)," Cranfield University, UK, pp. 96-133, Jul. 1, 2012.
Harper et al., "In-Store Control of Sprouting and Processing Quality Using CIPC and Ethylene AHDB-Potato Council Sutton Bridge Crop Storage Research Contents," Agriculture and Horticulture Development Board UK, pp. 2-25, Jan. 1, 2015, retrieved from the internet: https://potatoes.ahdb.org.uk/sites/default/files/publication_upload/R441%20Final%20Report_as%20published.pdf.

POTATO STORAGE

This application is a U.S. nationalization under 35 U.S.C. § 371 of International Patent Application No. PCT/EP2020/081598 filed Nov. 10, 2020, which claims priority to GB 2007265.8 filed May 15, 2020; the entire contents of each are incorporated herein by reference.

The present invention relates to a method of storing potatoes.

Potatoes can be stored for up to a year but storability is mainly governed by potato cultivar and storage regime. There are two phases which dictate the storability of potato; the period of physiological dormancy after harvest (endodormancy) and the period of sprout suppression (ecodormancy).

Dormancy has been defined as "the temporary suspension of visible growth of any plant structure containing a meristem" (Lang et al, 1987).

In this specification, endodormancy refers to the period after tuber initiation, extending for an indeterminate period after harvest, where tuber meristems (eyes) do not sprout and are under the control of physiological factors; and ecodormancy describes any period after endodormancy where the tubers are no longer physiologically dormant but where external environmental factors inhibit growth of the meristem, thereby suppressing sprout growth. The term "eye movement" refers to the early visible stages of growth of tuber meristems which if not suppressed will go on to form sprouts, and in this specification "eye movement" as an indicator of dormancy break means that the tuber meristems have grown to a length of at least 1 mm. In this specification, the term "peeping" is synonymous with exhibiting "eye movement" as defined above.

There are several technologies which are employed to initiate and/or extend the ecodormancy of potatoes. For potatoes which are for domestic or table use, tubers are typically stored at low temperature, and optionally in an ethylene containing environment. Such storage conditions may increase the sugar content of the potatoes. For potatoes which are intended to be processed, it is generally important to maintain a low sugar (glucose, fructose and sucrose) content during the storage period, and hence higher storage temperatures in combination with a chemical sprout suppressant are generally employed. As a rule, higher storage temperatures may be preferred to avoid cold-induced sweetening, since such cold-induced sweeting would result in an increased sugar content. For potatoes that are to be processed, for example by frying to form potato chips, or potato crisps, an increased sugar content can lead to undesired excessive browning during frying, and can potentially increase the acrylamide content of the resultant fried product, which is not desired since acrylamide in the diet causes cancer in animals, and is believed to have the potential to cause cancer in humans as well.

In a publication entitled "Acrylamide Toolbox 2019" published by FoodDrinkEurope, Avenue des Nerviens, 9-31, 1040 Brussels, Belgium, which is a comprehensive disclosure of acrylamide mitigation strategies currently used for the manufacture of a large variety of food and drink products, it is disclosed (page 21 for potato-based snacks and page 31 for French fries) that controlling reducing sugar is currently the primary measure employed by the industry to reduce acrylamide levels in potato-based snacks and French Fries, and that this is achieved through, inter alia, controlling storage conditions from farm to factory, e.g. temperature (at least above 6° C. for long term storage, but temperature specified for the individual potato cultivar stored), and managing humidity to minimise senescent sweeting. It is known that a temperature of at least above 6° C. is used for long term storage otherwise there is a problem of cold storage-induced sugar formation, otherwise called cold-induced sweetening.

Historically, the most commonly used chemical sprout suppressant is chlorpropham (CIPC) and CIPC is currently commonly used in the United States of America as a chemical sprout suppressant for potato tubers. However the toxicology profile of CIPC as interpreted by regulatory authorities has led to concerns over possible withdrawal or restrictions of that chemical sprout suppressant. Recently, CIPC has been withdrawn from use in Europe. It is recognized that without a viable alternative to CIPC, future long-term and year round potato supplies for processing will be threatened.

It has previously been proposed to use chemical treatments to modify the conditions under which the potatoes are stored.

A number of studies have investigated the effect of chemical treatments on potato tuber physiology during storage to achieve both sprout suppression and lower concentrations of reducing sugars throughout the storage period.

One paper is entitled "Differential effect of ethylene supplementation and inhibition on abscisic acid metabolism of potato (*Solanum tuberosum* L.) tubers during storage", by Sofia G. Foukaraki, Katherine Cools, and Leon A. Terry, in Postharvest Biology and Technology 112 (2016) 87-94. That paper discloses that two potato cultivars 'Estima' and 'Marfona' were treated with air or continuous ethylene (10 μL/L), transferred from air to ethylene or vice versa at first indication of sprouting (10% peeping of the control tubers), over three seasons. In that paper, "peeping" is equivalent to "eye movement" as defined hereinabove. Prior to any treatment and storage, the tubers underwent a controlled cooling regime from 15° C. (arrival temperature), at a rate of 0.5° C. reduction per day at ambient relative humidity (RH), to a holding temperature of 6° C., in order to minimize chilling stress and allow time for wound healing; such controlled cooling being known in the art as "pulldown". The ethylene binding inhibitor, 1-methylcyclopropene (1-MCP), was applied (1 μL/L for 24 h) either after pulldown and/or at first indication of sprouting during storage. Tubers were stored at 6° C. for 30 weeks and assessed for sprout length and number, and non-structural carbohydrate content. Subsequent to the 1-MCP treatment, ethylene applied after pulldown or at the first indication of sprouting reduced sprout growth significantly for both cultivars while ethylene-induced sugar accumulation was prevented by 1-MCP application prior to ethylene storage. Multiple applications of 1-MCP showed no additional benefit to ethylene induced sugar accumulation. However, the reducing sugar concentrations, i.e. of fructose and glucose, were still undesirably rather high for many potato processing applications, for example the manufacture of fried potato chips.

A further paper is entitled "Impact of ethylene and 1-MCP on sprouting and sugar accumulation in stored potatoes", by Sofia G. Foukaraki, Katherine Cools, Gemma A. Chope and Leon A. Terry, in Postharvest Biology and Technology 114 (2016) 95-103. That paper discloses that continuous exposure to ethylene during storage prolongs storage life of potatoes by suppressing sprouting. Potato cultivars Saturna and Russet Burbank, which are processing cultivars, were stored at 6 μC. under four ethylene treatments (viz. continuous ethylene (10 μL/L), continuous air, transfer from air to ethylene after first indication of sprouting and vice versa) for 30 weeks in 2008-2009 (Year 1). In Year 2 (2009-2010), tubers were stored under the same treatments and duration as in Year 1, with the addition of the ethylene binding inhibitor 1-MCP (1 μL/L) applied for 24 h at harvest or at first indication of peeping. The potato tubers were subjected to a controlled cooling regime from the arrival temperature of 15° C. to a holding temperature of 6° C. by cooling the tubers at a rate of 0.5° C. per day at ambient relative humidity. The tubers were treated with 1-MCP only after such a temperature pulldown to 6° C., by exposing the tubers to 1 μL/L of 1-MCP for 24 hours at 6° C. Fructose, glucose and sucrose were determined in potato flesh of all cultivars as ethylene had been reported to have some negative effects on non-structural carbohydrate metabolism. Sprouting was also measured at the end of the experiment. Ethylene applied after first indication of sprouting was as effective at suppressing sprouting for cv. Russet Burbank as when applied continuously; the implications of which are that the cost of ethylene application in store rooms could be reduced by manipulating timing of continuous application. In addition, application of ethylene after the first indication of sprouting had little to no effect on tuber sugar accumulation compared with continuous ethylene application from harvest. However, again the absolute concentrations of reducing sugars, i.e. of fructose and glucose, were still undesirably rather high for many potato processing applications, for example the manufacture of fried potato chips.

These papers disclose that 1-methylcyclopropene (1-MCP) is used in combination with ethylene so as to function as an ethylene binding inhibitor.

Currently, there exists a need in the art for a potato storage regime which can reduce or avoid the use of CIPC or other applied chemical sprout suppressants which may leave residues on the potatoes, and which additionally can exhibit the combination of sprout suppression and maintenance of low sugars (fructose, glucose and sucrose).

Currently, there also exists a need in the art for a potato storage regime which can avoid the risk of ethylene-induced increase in fructose, glucose and sucrose when ethylene is used in isolation as a chemical sprout suppressant, and also can reduce the cost of using ethylene as a chemical sprout suppressant. There is a continued need for a potato storage regime that can exhibit improved control of the combination of sprout suppression and maintenance of low sugars (fructose, glucose and sucrose).

A potato storage protocol exhibiting the combination of sprout suppression and maintenance of low sugars in the stored potatoes coupled with reduced or no use of applied chemical sprout suppressants would be a major advance for the potato industry and it is an aim of this invention to provide such a potato storage method.

Despite the extensive research, as summarised above, into the use of various chemical sprout suppressants for use on potato tubers, such as CIPC, ethylene, 1,4-dimethyl naphthalene (1,4-DMN) and other dormancy modulators or sprout suppressants, as well as combination treatments such as ethylene and 1-MCP and associated treatment protocols, there is nevertheless still a need in the art for an effective sprout suppressant treatment protocol which can provide effective control of reducing sugars as well as sprout suppression in potato tubers in a reliable, cost effective storage method that can be readily and commercially implemented in the potato storage industry.

It is accordingly an aim of this invention to provide a method of storing potatoes which at least partially overcomes at least some of these significant disadvantages of the existing potato storage methods and protocols currently used in the potato industry.

The present invention provides a method of storing potatoes, the method comprising the steps of:
i. providing a plurality of dormant potatoes, wherein the potatoes have been cured after harvesting;
ii. treating the potatoes with 1-methylcyclopropene, the treatment comprising exposing the potatoes, which are at a first treatment temperature within the range of from 10 to 30° C., to 1-methylcyclopropene;
iii. storing the potatoes at a second storage temperature within the range of from greater than 1 to up to 6° C. for a storage period within a potato store, wherein the storage period extends continuously until at least 1 week after initiation of eye movement in at least one of the potatoes, and wherein during the storage period the potatoes are stored in atmospheric air free of an external supply of ethylene sprout suppressant.

The present invention further provides the use of 1-methylcyclopropene as a pre-treatment for suppression of cold storage-induced sugar formation in potatoes stored at a temperature of from greater than 1 to up to 6° C. in atmospheric air free of an external supply of ethylene sprout suppressant.

In this specification, where it is disclosed that the potatoes are stored at a "storage temperature", since potatoes are stored for a significant period, measured in at least days but more typically weeks or months, this means that the potatoes themselves attain a substantially similar temperature as the "storage temperature"—in other words, the "storage temperature" is not merely the temperature within the potato store but is also substantially the temperature of the potato within the store. Correspondingly, in this specification, where it is disclosed that the potatoes are treated by a treatment comprising exposing the potatoes at a treatment temperature, again this means that the potatoes themselves are at substantially the same temperature as the "treatment temperature"—in other words, the "treatment temperature" is not merely the temperature of the environment during the treatment but is also substantially the temperature of the potato during the treatment.

For both of these inventions, preferred features are defined in the dependent claims.

The present invention relates to a method of storing potatoes using 1-methylcyclopropene (1-MCP) in the absence of any prior, simultaneous or subsequent application of ethylene.

Despite that fact that 1-methylcyclopropene (1-MCP) is known for use as an ethylene binding inhibitor, the present inventors have unexpectedly found that 1-methylcyclopropene can be used as a pre-treatment for suppression of cold storage-induced sugar formation in potatoes stored at a temperature of from greater than 1 to up to 6° C. in atmospheric air free of an external supply of ethylene sprout suppressant. The 1-methylcyclopropene (1-MCP) treatment alone, absent any ethylene, mitigates sugar increases typically associated with cold temperature storage of up to 6° C. whilst suppressing sprout growth and development.

Compared to known approaches to attempt to store potatoes to achieve sprout growth suppression as discussed above, the present invention can provide the combination of (a) reduced sprout growth and (b) maintenance of low levels of sugars, such as fructose, glucose and sucrose, in the stored potatoes. The additional cost and complexity of treating the potato tubers with ethylene during the storage period can be avoided.

The 1-methylcyclopropene (1-MCP) chemical treatment can provide the advantage of avoiding the need for any use of ethylene as a sprout suppressant. The storage costs are reduced as compared to the additional use of ethylene, and there is no detrimental effect on eye movement, i.e. there is no earlier incidence of eye movement, as compared to the use of ethylene.

In the preferred embodiments of the method of the present invention, prior to the 1-MCP treatment step, the cured dormant potatoes have not been subjected to a temperature pulldown to the storage temperature. By applying the 1-methylcyclopropene (1-MCP) chemical treatment before pulldown, the sugar concentration of the stored potatoes is reduced as compared to applying the 1-methylcyclopropene (1-MCP) chemical treatment after pulldown. This enhances potato quality for processing potatoes, and can reduce browning during frying or other high temperature cooking.

In addition, by applying the 1-methylcyclopropene (1-MCP) chemical treatment before pulldown, the weight loss of potatoes during storage can be reduced, which increases the yield of usable potatoes particularly when there is a poor quality potato crop. The reduced weight loss is believed to result primarily from reduced water loss during storage. Such reduced weight loss is also associated with improved texture, since the firmness of the potato is maintained for longer, resulting in improved potato texture during processing.

The present invention can permit potatoes to be stored under low storage temperatures which can assist sprout suppression, while obviating or reducing the need for other sprout suppressing chemicals, such as CIPC or 1,4-DMN or any other sprout suppressing chemical known to those skilled in the potato storage art, during storage, and can also achieve lower reducing sugar concentrations in the stored potatoes. This can significantly mitigate or avoid the problem of increased sugars, such as fructose, glucose and sucrose, in the potatoes. Increased levels of the reducing sugars glucose and fructose are associated with an increase in the incidence of browning during cooking, particularly during frying, and a reduction in, and an increase in the variability of, product quality during the manufacture of potato products such as potato chips, or potato crisps.

The present invention is at least partly predicated on the finding by the present inventors that when using 1-MCP in a potato storage protocol which is absent of ethylene, a specific targeted application of 1-MCP to the storage atmosphere prior to any pulldown of the temperature of the potatoes to a storage temperature of greater than 1 to up to 6° C., can unexpectedly achieve low concentrations of reducing sugars, while still achieving effective sprout suppression. Prior to the 1-MCP treatment step, the cured dormant potatoes have not been subjected to a temperature pulldown to the storage temperature. By treating with 1-MCP at a relatively high temperature, which is at least 10° C., but then without any subsequent treatment with ethylene during the storage period, the reducing sugar concentration can be reduced as compared to treating with 1-MCP at a relatively low temperature, after pulldown to a temperature which is up to 6° C.

The inventors have found that by providing a controlled time/temperature relationship for the 1-MCP treatment, and by avoiding any subsequent ethylene treatment after the 1-MCP treatment, the endodormant period of the potatoes during storage can be extended without adversely increasing the levels of sugars in the potatoes. This combined benefit is not derivable intuitively from the state of the art previously disclosed with respect to potato storage, and in particular with 1-MCP and then ethylene treatment. The present inventors have even further overcome the conflict in the prior art between achieving extended dormancy on the one hand and achieving minimal levels of sugars on the other hand.

By providing extended potato dormancy without increasing sugar levels and by the use of no chemical sprout suppressant or dormancy modulator (such as CIPC or 1,4-dimethyl naphthalene (1,4-DMN)), or a lower level of chemical sprout suppressant (such as CIPC or 1,4-dimethyl naphthalene (1,4-DMN)) as compared to known commercially implemented regimes for potato storage, the present invention can provide a number of technical and commercial advantages over the state of the art.

First, the potato storage regime is easier to control in order to reliably and consistently provide a high quality supply of stored potatoes for an extended period after harvesting. The use of the 1-MCP treatment before pulldown may be the single modified variable of the entire storage regime, and can provide a readily implementable potato storage regime.

Second, the use of the 1-MCP treatment before pulldown may be employed as one option to providing an alternative, or a supplement, to the use of a chemical sprout suppressant such as CIPC or 1,4-DMN or any other sprout suppressing chemical known to those skilled in the potato storage art; as discussed above CIPC has been withdrawn in Europe and stricter regulations on its use, may be imposed by food safety regulators elsewhere.

Third, processing potatoes can be stored at a lower storage temperature which can assist sprout suppression, without compromising the maintenance of low concentrations of sugars such as fructose and glucose which is particularly desirable for potatoes to be processed by a cooking step such as frying, since cold storage-induced sugar formation, or cold induced sweetening is reduced or minimised.

Fourth, avoiding the use of ethylene reduces the cost and complexity of the potato storage.

Embodiments of the present invention will now be described by way of example only, with reference to the accompanying drawings, in which.

The present invention relates to a method of storing potatoes. The method comprises the initial step of providing a plurality of dormant potatoes. The dormant potatoes preferably include at least some potatoes that are endodormant, and preferably all of the potatoes are endodormant. However, the plurality of dormant potatoes may include at least one or more ecodormant potatoes, and so the plurality of dormant potatoes may comprise endodormant potatoes, ecodormant potatoes or a combination of ecodormant and endodormant potatoes.

As is well known to those skilled in the art of potato production and storage, curing, also known in the art as suberization, is an important element of modern potato production. Curing heals wounds in the potato surface that are formed during harvesting by promoting suberin formation below damaged cells, and also dries the crop to reduce disease development. Curing can be achieved in the field or artificially in store.

In the methods of the present invention, the potatoes have been cured after harvesting; for example, before treating the potatoes with 1-MCP in accordance with the present invention, the potatoes have been cured after harvesting by storing the potatoes at a temperature within a temperature range of typically from 10 to 20° C. for a period of from 3 to 14 days, preferably at a relative humidity of from 90 to 95%, in atmospheric air at atmospheric pressure. The curing temperature is typically the harvest temperature. The harvest temperature may vary between different potato growing regions around the world. The curing is conventionally carried out after harvesting in order to allow a protective layer of cells to form an outer skin on the tubers and to allow at least partial healing of wounds caused by the harvesting process.

Typically, the curing step is initiated within a period of up to 14 days after harvesting the potatoes from the ground, preferably within a period of up to 7 days after harvesting the potatoes from the ground.

Preferably, the cured potatoes are endodormant prior to their subsequent treatment and storage, as described below.

The cured potatoes are then treated chemically by a treatment step of treating the potatoes with 1-methylcyclopropene (1-MCP). Preferably, the 1-MCP treatment step is initiated within a period of up to 14 days after termination of the curing step, typically within a period of up to 7 days after termination of the curing step.

Prior to the 1-MCP treatment step, the cured dormant potatoes have not been subjected to a temperature pulldown to the storage temperature.

Preferably, the time period between curing and temperature pulldown should be as short as possible, but allowing for a 24 h 1-MCP treatment followed by 24 h ventilation period in air.

The first treatment step of treating the potatoes with 1-methylcyclopropene is carried out prior to chilling the potatoes, and in particular prior to chilling the potatoes to a chilled temperature at which they are to be stored in a long term (i.e. a period of at least 4 weeks) potato storage facility.

In the embodiments of the present invention there is a temperature pulldown step after the 1-MCP treatment step since the second storage temperature is lower than the first treatment temperature, and during the temperature pulldown step the potatoes are subjected to a temperature pulldown during a pulldown period to reduce the temperature of the potatoes from the first treatment temperature to the second storage temperature.

The 1-MCP treatment temperature is within the range of from 10 to 30° C., and the storage temperature is within a lower, non-overlapping storage temperature range of from greater than 1 to up to 6° C.

This chilled storage temperature range may be used for potatoes to be sold for use as table potatoes, i.e. for domestic use, or for potatoes to be sold to be processed commercially, for example to manufacture potato chips or crisps.

Such cooling of potatoes to a chilled storage temperature range, for example within the range of from greater than 1 to up to 6° C., is typically known to those skilled in the art of potato storage as "pulldown"—in "pulldown" the potato tubers are subjected to a controlled cooling regime from an initial temperature, typically the temperature at which the potatoes were transported and delivered to the potato storage facility, to a lower storage temperature. For example, a typical controlled cooling regime cools the potatoes from a delivery temperature of about 10 to 20° C. to a storage temperature of from greater than 1 to up to 6° C., such as within the range of from 2 to up to 6° C., typically within the range of from 4 to up to 6° C., at a controlled cooling rate selected to minimize chilling stresses in the potatoes and allow time for any further wound healing in addition to any wound healing previously occurring during the curing process. A typical cooling rate is a 0.5° C. reduction in temperature per day at ambient relative humidity.

The chemical treatment, preferably the sole chemical treatment, comprises a treatment step of treating the potatoes with 1-methylcyclopropene. Preferably, prior to the 1-MCP treatment step, the cured dormant potatoes have been maintained, post curing, at a temperature of at least 10° C.

The 1-MCP treatment step comprises exposing the potatoes to 1-methylcyclopropene. Prior to the 1-MCP treatment step, the cured dormant potatoes have not been subjected to a temperature pulldown to the storage temperature, i.e. at no stage prior to the 1-MCP treatment step are the cured dormant potatoes subjected to a temperature pulldown to a temperature value sufficiently low so as to be within the temperature range of the storage temperature. During the 1-MCP treatment step the potatoes are at a first treatment temperature within the range of from 10 to 30° C., more typically from 12 to 25° C., for example from 12 to 22° C.

Typically, the 1-MCP treatment step is carried out for a first treatment period of at least 12 hours, optionally from 12 to 36 hours, further optionally from 18 to 30 hours, yet further optionally about 24 hours.

Typically, during the 1-MCP treatment step the potatoes are stored in a store (which may be the same store used for subsequent long term storage) having a store volume, and the 1-methylcyclopropene is applied at a concentration of from 0.5 to 5 µL/L, optionally from 0.5 to 2 µL/L, further optionally from 0.75 to 1.25 µL/L, yet further optionally about 1 µL/L, wherein the concentration in µL/L is the ratio of the volume of 1-methylcyclopropene to the store volume.

The 1-methylcyclopropene is typically in a commercially available powder form in which the 1-MCP is bound with cyclodextrin, which is treated to generate 1-methylcyclopropene in gaseous form from the 1-methylcyclopropene powder. The 1-MCP may be applied by adding the powdered 1-MCP (e.g. the product sold under the trade mark Smartfresh sold AgroFresh, USA) to warm water (50° C.) to release the gas, as disclosed in section 2.2.1 of the Foukaraki et al paper entitled "Impact of ethylene and 1-MCP on sprouting and sugar accumulation in stored potatoes" as discussed above. For example, to generate 1-MCP at a concentration of 1 µL/L, in air, a dose of 1.8 g of Smartfresh (comprising 0.14 wt % 1-MCP) is added to a conical flask, then 20 mL of warm water at 50° C. was added to release the gaseous 1-MCP. The concentration of the 1-MCP may be measured and checked using calibrated gas chromatography.

Therefore, prior to the subjecting of the potatoes to the storage temperature, the cured dormant potatoes are treated with 1-methylcyclopropene by exposing the potatoes to 1-methylcyclopropene.

After the 1-MCP treatment step, the potatoes are then stored at the second storage temperature within the range of from greater than 1 to up to 6° C., for example within the range of from 2 to up to 6° C., optionally within the range of from 4 to up to 6° C.

Typically, the stored potatoes are processing potatoes, for the manufacture of potato chips or French fries, or table or domestic potatoes.

The storage period is initiated no more than 1 week, preferably no more than 2 days, more preferably immediately, after termination of the temperature pulldown step after the 1-MCP treatment step.

Preferably, the potatoes are stored in atmospheric air at atmospheric pressure.

The stored potatoes are typically monitored for an indicator of dormancy break, at which the endodormant potatoes become ecodormant potatoes. As described above, the term "eye movement" refers to the early visible stages of growth of tuber meristems which if not suppressed will go on to form sprouts, and in this specification "eye movement" as an indicator of dormancy break means that the tuber meristems have grown to a length of at least 1 mm, and the detected eye movement may be present anywhere on the outer surface of the potato tuber.

In the present invention, the eye movement as an indicator of dormancy break is defined as meaning that any tuber meristems have grown to a length of at least 1 mm. Such eye movement is visible to the naked eye. The tuber meristems, if not suppressed, would continue to grow and form sprouts in the potatoes.

During the storing step, the potatoes are stored for a storage period within a potato store. The storage period extends continuously until at least 1 week after initiation of eye movement in at least one of the potatoes, typically until at least 1 week after initiation of eye movement in from 1 to 10% by number of the potatoes. Preferably, the storage period extends continuously until at least 4 weeks after initiation of eye movement in at least one of the potatoes, typically until at least 4 weeks after initiation of eye movement in from 1 to 10% by number of the potatoes.

In preferred embodiments of the present invention, the storage period extends continuously for at least 20 weeks.

During the storage period the potatoes are stored in atmospheric air free of an external supply of ethylene sprout suppressant. Preferably, the potatoes are free from exposure to an external supply of ethylene for the entire period from harvesting until termination of the storage period.

In preferred embodiments of the present invention the cured potatoes have not been treated with a sprout suppressant or dormancy modulator, for example chlorpropham (CIPC) or 1,4-dimethyl naphthalene (1,4-DMN), at any time before, during or after treating the potatoes with 1-MCP.

In other embodiments of the present invention, the cured potatoes may, be treated with a sprout suppressant or dormancy modulator, for example chlorpropham (CIPC) or 1,4-dimethyl naphthalene (1,4-DMN), typically before the long term storage step and before or after treating the potatoes with 1-MCP.

The embodiments of the present invention employ 1-methylcyclopropene (1-MCP), either preferably in the absence of a dormancy modulator such as CIPC or 1,4-DMN, or alternatively in the presence of a reduced total dose of a dormancy modulator such as CIPC or 1,4-DMN as compared to current commercial CIPC or 1,4-DMN doses. For example, a typical current commercial dose of CIPC is a total of 24-36 grams per tonne of potatoes, whereas when CIPC is optionally used in the method of the present invention the CIPC treatment step may employ a chlorpropham (CIPC) concentration of from 8 to 36 grams but preferably from 8 to 16 grams per tonne of potatoes, which enables the option of a reduced total CIPC dose to be employed as compared to current commercial CIPC doses. In practice, the stored potatoes are stored in a large storage facility and the dormancy modulator such as CIPC or 1,4-DMN is delivered via air flow from a plenum to provide a CIPC- or 1,4-DMN-containing atmosphere to which the stored potatoes are exposed.

Therefore the treatment protocol according to embodiments of the preset invention may comprise the following sequences:

i. Cure harvested potatoes; treat with 1-MCP at temperature above storage temperature; temperature pulldown to storage temperature; store at storage temperature; no other chemical treatment at any time.

ii. Cure harvested potatoes; treat with 1-MCP at temperature above storage temperature; temperature pulldown to storage temperature; treat with non-ethylene sprout suppressant or dormancy modulator at any time prior to storage; store at storage temperature; no ethylene treatment at any time, although optional non-ethylene sprout suppressants or dormancy modulators may be applied during storage.

In the embodiments of the present invention in which the potatoes have been treated with a sprout suppressant or dormancy modulator, for example chlorpropham (CIPC) or 1,4-dimethyl naphthalene (1,4-DMN), the present invention can utilize lower concentrations of the sprout suppressant or dormancy modulator than are currently conventionally used in commercial potato storage. If a sprout suppressant or dormancy modulator is optionally used in combination with treating the potatoes with 1-MCP in accordance with the present invention, the sprout suppressant or dormancy modulator is typically only used in a single treatment, rather than used in plural sequential treatments that are used in the commercial potato storage regimes of the prior art.

The treatment of potatoes using a sprout suppressant or dormancy modulator such as CIPC and 1,4-DMN is well known to those skilled in the art of potato production and storage. For example, as is well known in the art, the sprout suppressant or dormancy modulator can be applied as a fog using a petrol or electro fogger. Multiple fog formulations are commercially available (i.e. solid or liquid). Tubers can also be dipped into a sprout suppressant or dormancy modulator liquid formulation.

Typically, the treatment with the sprout suppressant or dormancy modulator comprises: a treatment step which exposes the potatoes to the sprout suppressant, for example at a chlorpropham (CIPC) dose rate of from 8 to 16 grams per tonne of potatoes, or at a 1,4-dimethyl naphthalene (1,4-DMN) sprout suppressant dose rate of from 15 to 25 ml per tonne of potatoes, after curing, and preferably within a period of less than 4 weeks from harvesting. Optionally, the sprout suppressant or dormancy modulator is applied within a period of 1 week after the 1-MCP treatment step.

However, as described above preferably a sprout suppressant or dormancy modulator treatment is not used in the preferred embodiments of the present invention.

The present invention is illustrated further with reference to the following non-limiting Examples.

EXAMPLES 1 AND 2 AND COMPARATIVE EXAMPLES 1 AND 2

Potato tubers of the two commercially available cultivars Shelford (Example 1) and VR808 (Example 2) which had been harvested in the summer of 2016 were provided. The tubers were dormant and had been cured conventionally. Upon arrival at the laboratory testing facility in October 2016, the tubers of each cultivar were placed in stackable trays and stored in an air tight storage box of at least 100 litres capacity which was sealed with water.

Each cultivar of potatoes was promptly exposed (on 19 Oct. 2016) to 1-MCP at a concentration of 1 µL/L based on the volume of the storage box for a period of 24 hours, with the exposed potatoes being at an ambient temperature of about 13° C. There was no temperature pulldown to the storage temperature before the 1-MCP treatment.

The potatoes were then subjected to a temperature pulldown to a storage temperature of 5.5° C. The temperature pulldown was at a rate of 0.5° C. per day. The treated potatoes were not subjected to a temperature pulldown to a temperature of below 10° C. before the 1-MCP treatment.

The potatoes were then stored in air, at atmospheric pressure, and at a storage temperature of 5.5° C. There was no chemical treatment after the temperature pulldown to a storage temperature of 5.5° C. In particular, no external ethylene was supplied to the potato store. No CIPC or other chemical sprout suppressant or dormancy modulator was applied to the potato tubers. Therefore, Examples 1 and 2 are within the scope of the present invention.

As a comparison, a second batch of each of the potatoes of the two cultivars Shelford (Comparative Example 1) and VR808 (Comparative Example 2) were subjected to the same curing, and storage conditions, but the potatoes were not treated with 1-MCP. Therefore Comparative Examples 1 and 2 are outside the scope of the present invention.

Figure 1A:
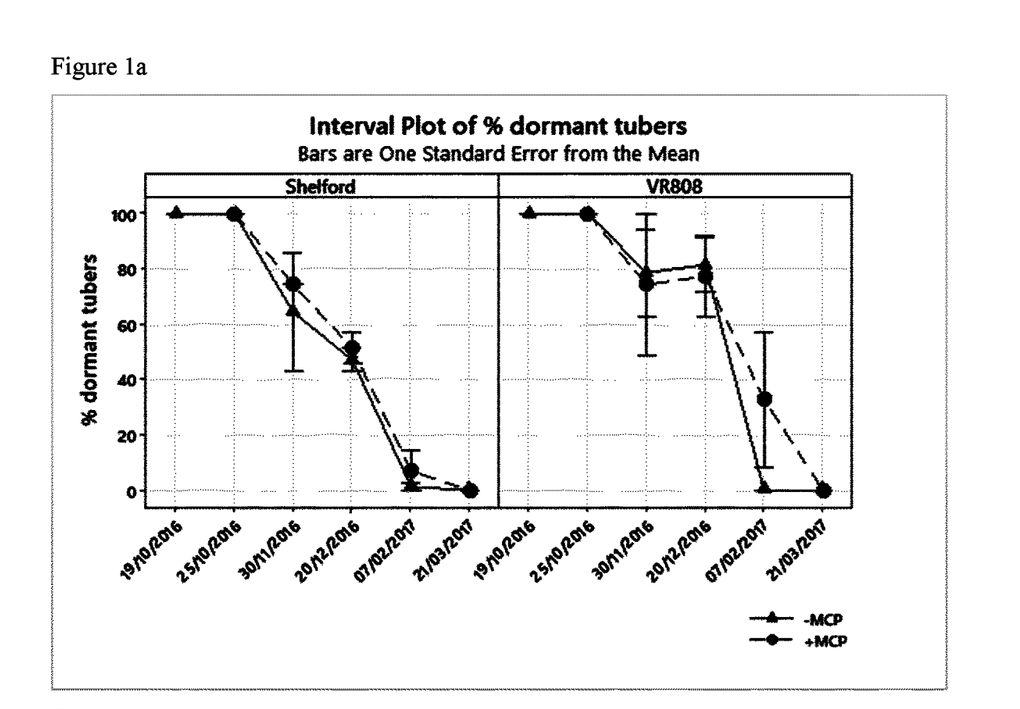
FIGS. 1a, 1b and 1c show the relationship between, respectively, the % dormancy by number, the % peeping tubers by number and the % sprouted tubers by number and the storage period for potatoes stored in Examples 1 and 2 according to the invention and Comparative Examples 1 and 2 not according to the invention.
Figure 1B:
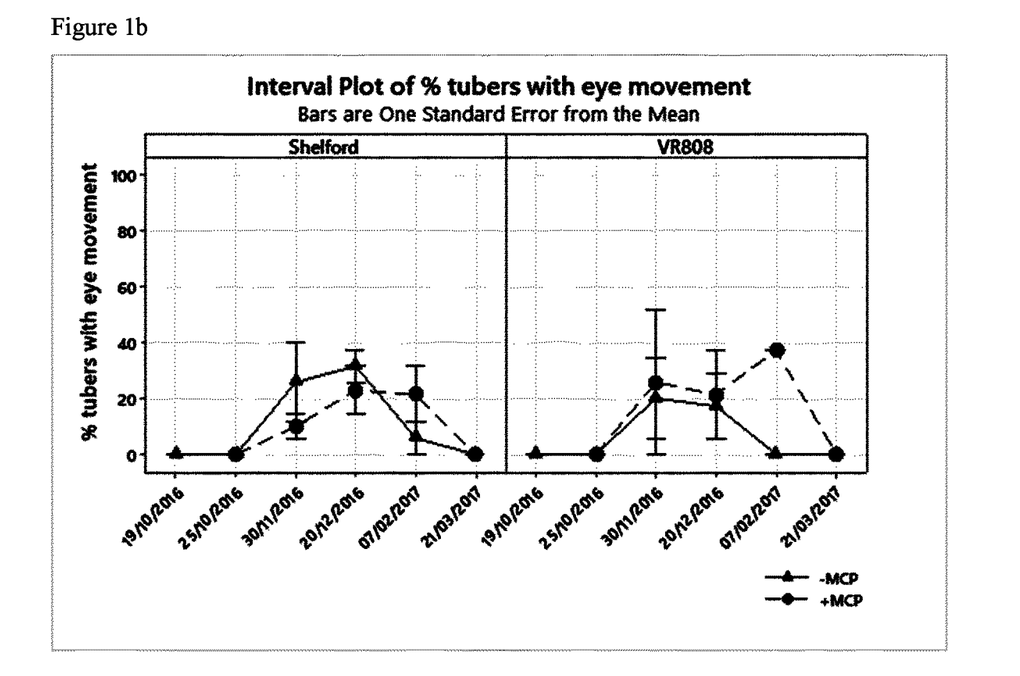
Figure 1C:
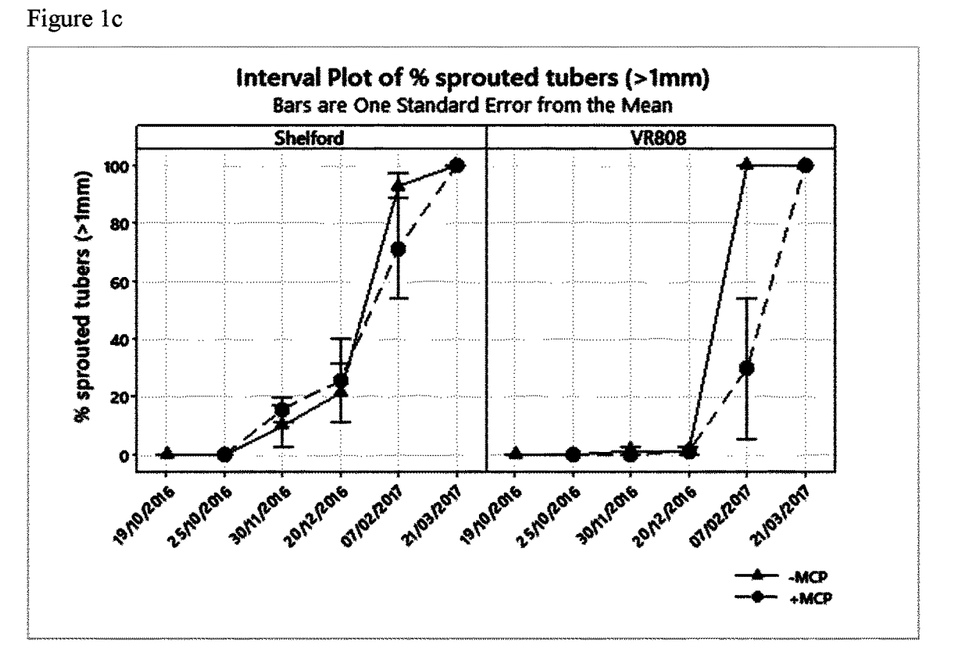

The sprout suppression effect of the treatment with 1-MCP in accordance with the present invention is shown in FIGS. 1a, 1b and 1c. In FIGS. 1a, 1b and 1c for each of the two cultivars Shelford and VR808 there are three plots of the relationship, with respect to the storage time period, for, respectively, the % by number of tubers exhibiting dormancy (i.e. with no eye movement), the % by number of tubers exhibiting peeping (i.e. with eye movement meaning sprouts no longer than 1 mm) and the % by number of tubers exhibiting sprouting (i.e. with sprouts longer than 1 mm). The potato tubers of each of the first and second batches of the two cultivars were tested. For each cultivar, in FIGS. 1a, 1b and 1c the first batch is indicated with the letters "+MCP" whereas the reference second batch is indicated with the letters "−MCP". In FIGS. 1a, 1b and 1c, the eye movement/sprouting data was measured at each sampling time point.

It may be seen from FIGS. 1a, 1b and 1c that for the cultivar Shelford the treatment with 1-MCP in accordance with the present invention caused a slight delay in dormancy break, a slight reduction in peeping tubers about 6-8 weeks after the 1-MCP treatment and a slight reduction in sprouting tubers about 14-16 weeks after the 1-MCP treatment, as compared to the tubers not treated with 1-MCP. It may also be seen from FIGS. 1a, 1b and 1c that for the cultivar VR808 the treatment with 1-MCP in accordance with the present invention caused a significant delay in dormancy break of about 4-6 weeks as compared to the tubers not treated with 1-MCP. There was an increase in peeping tubers but a significant decrease in sprouting tubers about 14-16 weeks after the 1-MCP treatment as compared to the tubers not treated with 1-MCP.

In summary, the treatment with 1-MCP in accordance with the present invention can reduce eye movement and extend the dormancy of potato tubers stored at a temperature of from greater than 1 to up to 6° C.

Figure 2:
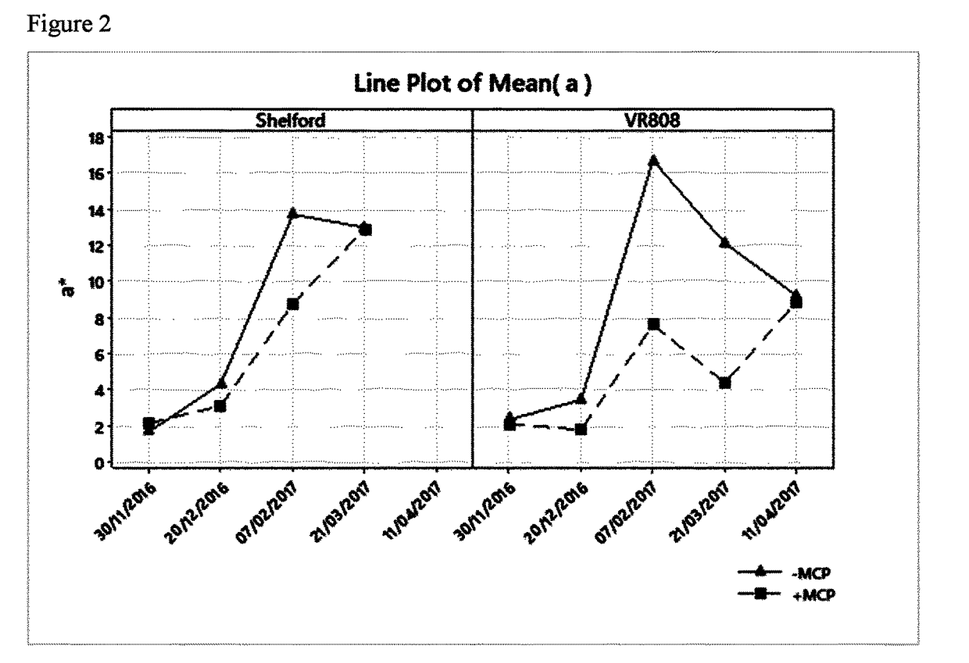
FIG. 2 shows the relationship between the value of the a* colour coordinate of a fried potato chip produced from the stored potatoes and the storage period for potatoes stored in Examples 1 and 2 according to the invention and Comparative Examples 1 and 2 not according to the invention.

The potatoes of the first batch treated with 1-MCP and the second batch not treated with 1-MCP were also periodically tested by producing fried potato chips from the potatoes, and measuring the coloration, expressed as the mean value of the a* colour coordinate of the CIELAB colour space. The a* colour coordinate, when positive, is associated with increased browning of the potato chips. Excess browning is associated with excess reducing sugar concentration in the potato during frying. The results are shown in FIG. 2. For each cultivar, in FIG. 2 the first batch is indicated with the letters "+MCP" whereas the reference second batch is indicated with the letters "−MCP".

It may be seen that for each cultivar the treatment with 1-MCP was generally associated with a low value of the a* colour coordinate of a fried potato chip produced from the potato, and therefore reduced browning. In contrast, for each cultivar of the second batch which had not been treated with 1-MCP was generally associated with a higher value of the a* colour coordinate of a fried potato chip produced from the potato, and therefore increased browning.

From the experimental data of FIGS. 1 and 2 it can be concluded that the fructose and glucose concentrations of the potatoes of the two cultivars are generally lowered by the 1-MCP treatment as compared to not treating the potato tubers with 1-MCP. The results shown in FIGS. 1 and 2 therefore comprise evidence of reduced cold storage-induced sugar formation in potatoes stored at a temperature of from greater than 1 to up to 6° C. in atmospheric air free of an external supply of ethylene sprout suppressant. Such cold storage-induced sugar formation, otherwise known as cold induced sweetening, is caused by conversion of carbohydrate, i.e. starch, in the potatoes into sugars such as fructose, glucose and sucrose when the physiology of the potatoes changes as a result of being exposed for an extended period to storage temperatures of up to 6° C. As discussed above, "eye movement" refers to the early visible stages of growth of tuber meristems, i.e. the tuber meristems have grown to a length of at least 1 mm, and "eye movement" is an indicator of dormancy break into a non-dormant state.

In other words, for the potatoes treated with 1-MCP in accordance with the invention, cold storage-induced sugar formation, otherwise known as cold induced sweetening, was alleviated.

In contrast to the experimental results of the Examples, in the Foukaraki et al paper entitled "Impact of ethylene and 1-MCP on sprouting and sugar accumulation in stored potatoes" as discussed above, it is disclosed in some experiments that 1-MCP was applied either at harvest, i.e. before curing or after a temperature pulldown to a storage temperature of 6° C. In some experiments in the Foukaraki et al paper, potato tubers are stored in "continuous air" which means that after any 1-MCP may have been applied the potato tubers are subsequently stored in air rather than in ethylene.

The experimental results of the Foukaraki et al paper show that when potato tubers are stored in continuous air, subsequent to the application of 1-MCP at either of these specific stages, namely at harvest before curing or after temperature pulldown, there was no improvement with respect to potato tuber dormancy and potato tuber sprout length as compared with an air control. In the Foukaraki et al paper the air control is called "−1-MCP" and means that there was no application of 1-MCP and that the potatoes were stored in continuous air. In other words, the Foukaraki et al paper discloses two specific timings for the application of 1-MCP, namely before curing or after a temperature pulldown to a storage temperature of 6° C., but also discloses that such applications do not improve potato tuber dormancy or potato tuber sprout length, as compared with an air control, when the potato tubers are stored in continuous air.

In contrast, the present inventors have found, as evidenced by these Examples, that 1-MCP can extend potato tuber dormancy, and can significantly extend potato tuber dormancy in at least one potato cultivar, when applied after curing and before temperature pulldown to the storage temperature, thereby providing an optimal timing for the application of 1-MCP.

The experimental results of the Foukaraki et al paper also show that when potato tubers are stored in continuous air, subsequent to the application of 1-MCP at either of these specific stages, namely at harvest before curing or after temperature pulldown, there was no improvement with respect to the reducing sugar concentration in the potato tubers as compared with an air control. The Foukaraki et al paper shows that 1-MCP applied either at harvest, i.e. before curing, or after pulldown had no significant impact on fructose or glucose content at 4, 10, 25 and 30 weeks when compared with the air control.

In contrast, the present inventors have found, as evidenced by these Examples, a significant and positive impact on cold storage-induced sugar formation, or cold induced sweetening, when 1-MCP is applied after curing and before pulldown.

Figure 3:
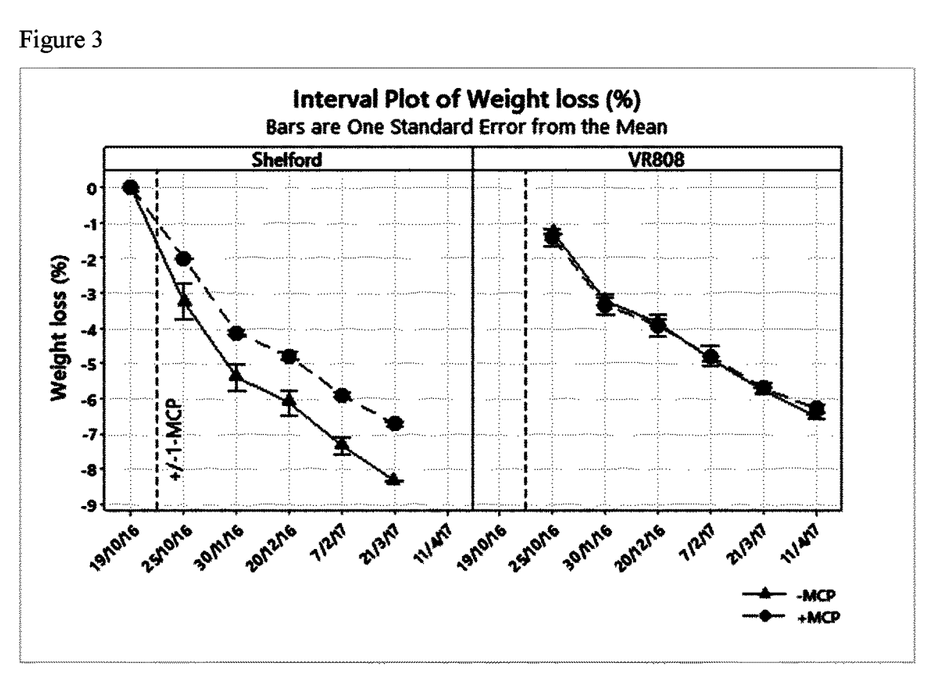
FIG. 3 shows the relationship between the mean value of weight loss and the storage period for potatoes stored in Examples 1 and 2 according to the invention and Comparative Examples 1 and 2 not according to the invention.

Referring to FIG. 3, for each of the two cultivars Shelford and VR808 the potatoes of the first and second batches were periodically tested by measuring the mean weight loss of the potatoes. For each cultivar, in FIG. 3 the first batch is indicated with the letters "+MCP" whereas the reference second batch is indicated with the letters "−MCP".

It may be seen that for each cultivar the treatment with 1-MCP of potatoes of the first batch was generally associated with a reduced weight loss as compared to the potato for each cultivar of the second batch which had not been treated with 1-MCP; for the Shelford potato tubers the weight loss reduction was significant, whereas for the VR808 potato tubers the weight loss reduction was small.

This experimental data shows that the use of the 1-MCP treatment, without any subsequent ethylene treatment during storage, can maintain low levels of reducing sugars in the stored potatoes, and can alleviate cold storage-induced sugar formation. The 1-MCP treatment can delay dormancy break and reduce weight loss in the stored potatoes. The 1-MCP treatment can achieve the combination of (a) increased sprout suppression and (b) lower reducing sugar concentration in the stored potatoes over the storage period.

The 1-MCP active is known in the art as an ethylene inhibitor which is known to reduce ethylene induced formation of reducing sugars, when ethylene is used as a sprout suppressant. However, these Examples show that the 1-MCP treatment in accordance with the method of the present invention can, in the absence of any ethylene treatment during the storage period, achieve low sugar concentration, and can also delay eye movement and delay sprout suppression, and thereby delay dormancy break. These effects are unexpected from the state of the art, and unexpected from the known use of the 1-MCP active as an ethylene inhibitor. The Examples show that the 1-MCP treatment, applied before pulldown and in a temperature range of from 10 to 30° C., can independently achieve the combination of increased sprout suppression and lower reducing sugar concentration, and delayed dormancy break, in the stored potatoes over an extended storage period, even at relatively low storage temperatures of greater than 1 to up to 6° C., with reduced or minimised cold storage-induced sugar formation.

Various modifications to the present invention will be readily apparent to those skilled in the art and are encompassed within the scope of the present invention as defined in the appended claims.

The invention claimed is:

1. A method of storing potatoes comprising the steps of:
providing a plurality of dormant potatoes that have been cured after harvesting;
treating the potatoes by exposing the potatoes, which are at a treatment temperature within the range of from 10° C. to 30° C., to 1-methylcyclopropene;
storing the potatoes within a potato store at a storage temperature greater than 1° C. to up to 6° C. for a storage period that extends continuously until at least 1 week after initiation of eye movement in at least one of the potatoes,
wherein during the storage period the potatoes are stored in atmospheric air free of an external supply of ethylene sprout suppressant.

2. A method according to claim 1 wherein prior to the treating step, the cured dormant potatoes have been maintained at a temperature of at least 10° C. subsequent to a curing step.

3. A method according to claim 1 wherein prior to the treating step, the cured dormant potatoes have not been subjected to a temperature pulldown to the storage temperature.

4. A method according to claim 1 further comprising a temperature pulldown step during a pulldown period, after the treating step, to reduce the temperature of the potatoes from the treatment temperature to the storage temperature.

5. A method according to claim 4 wherein the storage period is initiated no more than 1 week after termination of the temperature pulldown step after the treating step.

6. A method according to claim 5 wherein the storage period is initiated no more than 2 days after termination of the temperature pulldown step after the treating step.

7. A method according to claim 1, wherein the potatoes are free from exposure to an external supply of ethylene from harvesting.

8. A method according to claim 1, wherein the treating step is carried out for a treatment period of at least 12 hours.

9. A method according to claim 1, wherein during the treating step the potatoes are stored in a potato store having a store volume, and the 1-methylcyclopropene is applied at a concentration of from 0.5 to 5 µL/L, wherein the concentration in µL/L is the ratio of the volume of 1-methylcyclopropene to the store volume.

10. A method according to claim 1, wherein the treatment temperature is from 12° C. to 25° C.

11. A method according to claim 1, wherein the storage temperature is from 2° C. to up to 6° C.

12. A method according foregoing claim 1, wherein the storage period extends continuously until at least 4 weeks after initiation of eye movement in at least one of the potatoes.

13. A method according to claim 1, wherein the storage period extends continuously until at least 1 week after initiation of eye movement in from 1 to 10% by number of the potatoes.

14. A method according to claim 1, wherein the storage period extends continuously for at least 20 weeks.

15. A method according to claim 1, wherein in the storing step the potatoes are stored in atmospheric air at atmospheric pressure.

16. A method according to claim 1, wherein, before the treating step, the potatoes have been cured after harvesting by storing the potatoes at a temperature range of from 10° C. to 20° C. for a period of from 3 to 14 days in atmospheric air at atmospheric pressure.

17. A method according to claim 16 wherein the curing step is initiated within a period of up to 14 days after harvesting the potatoes from the ground.

18. A method according to claim 16 wherein the treating step is initiated within a period of up to 14 days after termination of the curing step.

19. A method according to claim 1, wherein prior to, during, or after the treating step the potatoes have not been treated with a sprout suppressant or dormancy modulator.

20. A method according to claim 1, wherein prior to, during, or after the treating step the potatoes are treated with a sprout suppressant or dormancy modulator.

21. A method according to claim 20 wherein the sprout suppressant is chlorpropham (CIPC) and is applied at a dose rate of from 8 to 16 grams per metric ton of potatoes or wherein the sprout suppressant is 1,4-dimethyl naphthalene (1,4-DMN) and is applied at a dose rate of from 15 to 25 ml per metric ton of potatoes.

22. A method according to claim 20 wherein the sprout suppressant is applied within a period of 1 week after the treatment step ii.

23. A method according to claim 1, wherein during the providing step the potatoes are endodormant.

* * * * *